United States Patent

Neumann et al.

[11] Patent Number: 5,959,061
[45] Date of Patent: Sep. 28, 1999

[54] HARDENERS FOR WATER-DILUTABLE EPOXY RESIN SYSTEMS WITH A POTLIFE INDICATION

[75] Inventors: Uwe Neumann, Mobile, Ala.; Martin Gerlitz, Graz, Austria

[73] Assignee: Vianova Resins GmbH, Mainz-Kastel, Germany

[21] Appl. No.: 08/900,519

[22] Filed: Jul. 25, 1997

[30] Foreign Application Priority Data

Jul. 26, 1996 [DE] Germany ............... 196 30 277

[51] Int. Cl.[6] ............................................. C08G 59/44
[52] U.S. Cl. ................... 528/119; 523/414; 525/523; 525/529; 528/91; 528/110
[58] Field of Search ................. 523/461, 414; 528/91, 110, 119; 525/523, 529

[56] References Cited

U.S. PATENT DOCUMENTS

| | | | |
|---|---|---|---|
| 4,197,389 | 4/1980 | Becker | 528/103 |
| 4,886,845 | 12/1989 | Becker et al. | 523/403 |
| 5,032,629 | 7/1991 | Hansen et al. | 523/414 |
| 5,236,974 | 8/1993 | Dreischhoff et al. | 523/403 |
| 5,382,606 | 1/1995 | Buetikofer | 523/404 |
| 5,459,180 | 10/1995 | Pfeil et al. | 523/403 |
| 5,539,023 | 7/1996 | Dreischhoff et al. | 523/404 |
| 5,587,409 | 12/1996 | Dreischhoff et al. | 523/404 |

FOREIGN PATENT DOCUMENTS 0 765 921 4/1997 European Pat. Off. .
765921 4/1997 European Pat. Off. .

*Primary Examiner*—Melyvyn I. Marquis
*Assistant Examiner*—D. Aylward
*Attorney, Agent, or Firm*—Foley & Lardner

[57] ABSTRACT

Water-dispersible curing agents for epoxy resins are disclosed which, as a mixture with epoxy resins, have a potlife indication by showing the end of the processing time by a clear increase in viscosity, and which comprise reaction products (ABC) of adducts of aliphatic polyols (A) with a weight-average molar mass of from 200 to 20,000 g/mol, comprising at least one polyol (A1) having a molar mass of less than 4000 g/mol, and at least one polyol (A2) having a molar mass of more than 4000 g/mol, and at least one epoxide compound (B) having at least two epoxide groups per molecule, and a specific epoxide group content of from 500 to 10 000 mmol/kg, (A1) and (A2) being reacted separately or as a mixture with (B), and then reacting this adduct with one or more polyamines (C) having at least three amine hydrogen atoms and at least one primary amino group per molecule, the ratio of the number of hydroxyl groups of component (A) to the number of epoxide groups of component (B) being 1:3 to 1:10, and the ratio of the number of remaining epoxide groups in the epoxide-polyol adduct to the number of amine hydrogen atoms in polyamines (C) being 1:1.5 to 1:100. The water-dispersible curing agents are useful as curing agents for epoxy resins in two component coating compositions.

20 Claims, No Drawings

HARDENERS FOR WATER-DILUTABLE EPOXY RESIN SYSTEMS WITH A POTLIFE INDICATION

BACKGROUND OF THE INVENTION

1. Field of the Invention

This invention relates to novel curing agents for epoxy resins that preferably are used for the preparation of aqueous epoxy resin-hardener emulsions or dispersions. These curing agents are distinguished by the fact that the end of the processing time can be recognized by an increase in the viscosity.

2. Description of Related Art

Water-dilutable epoxy resin systems have gained increasing importance among the cold-curing "water-based paints". These two component (2C) systems have outstanding properties in comparison with one component (1C) water-based paints. These 2C systems should be designed to have the following properties: only little or no solvent content; nonflammable; only little or no odor nuisance; easily processible; low sensitivity to moist substrates; good drying and rapid complete curing; excellent adhesion to most substrates; very good intercoat adhesion; good corrosion protection on metals and easy cleaning of working equipment directly after use.

European patent EP-B 0 000 605 discloses curing agents for aqueous epoxy resin dispersions which are prepared by reacting addition products of polyalkylene polyether polyols and water-insoluble polyepoxide compounds with polyamines. Unsaturated compounds that are still capable of addition reaction can be added onto the reactive groups of the polyamines.

In European patent EP-B 0 387 418, an attempt is made to simplify the difficult synthesis of a polyether-modified resin precursor by starting from polyether glycols having amino end groups. The precursor is reacted with an excess of polyamines to produce adducts in a second stage, which is similar, if not identical, to the addition reaction disclosed in EP-B 0 000 605.

European patent EP-A 0 567 831 describes aqueous curing agents comprising: (i) an emulsifier that is prepared from a polyalkylene polyether having amino end groups, an aliphatic diglycidyl ether and a fatty amine; (ii) a co-emulsifier prepared from a polyamine, an aliphatic diglycidyl ether and a fatty amine; and (iii) a bis-amine adduct of epoxy resin and a polyamine.

The curing agents described in each of the aforementioned documents have the substantial deficiency that it is not possible to indicate the end of the processing time when these curing agents are combined with most commercially available epoxy resins, water-emulsifiable epoxy resins or also solid epoxy resin dispersions. Persons skilled in the art, however, typically are used to visually seeing a clear increase in viscosity occurring toward the end of the processing time after mixing of the two-component system, when curing conventional systems, i.e. liquid and solid resin systems which can be solvent-free or can contain solvents. Visualizing the increase in viscosity is called pot life being indicated clearly visibly. Thus, by being capable of visualizing the increase in viscosity, this avoids avoids applying a system that has already reacted.

In the case of aqueous epoxy systems, an increase in viscosity which occurs promptly before the end of the duration of use can be observed exclusively with liquid resins in combination with a few aqueous hardeners, for example ®Epilink DP 660 from Akzo. It has so far not been possible at all to indicate the end of the processing time with solid epoxy resin dispersions. Because of the outstanding suitability of these dispersions for cold-curing two-component systems, such as described, for example, in the German patent DE-C 36 43 751 and in the German application DE-A 41 28 487, the lack of a pot life indication also is a deficiency here.

SUMMARY OF THE INVENTION

It therefore would be desirable to provide aqueous curing agents that indicate the end of the processing time regardless of the epoxy resin used. Surprisingly, this can be achieved both for water-dilutable liquid epoxy resins and for solid epoxy resin dispersions, if epoxide-polyol adducts according to the European patent application EP-A 0 618 245 (U.S. Pat. No. 5,459,180) or to DE-A 195 36 608 are used as an intermediate product. It is therefore an object of the invention to provide water-dispersible curing agents for epoxy resins which, in addition to having the obviously good emulsifying action on liquid epoxy resins and the compatibility with solid epoxy resin dispersions, show a clear increase in the viscosity at the end of the processing time when processed in combination with epoxy resins.

In accordance with these and other objects of the invention, there are provided water-dispersible curing agents for epoxy resins, which can be obtained by reaction of
 (A) two or more aliphatic polyols having a weight-average molar mass $M_w$ of the mixture of 200 to 20,000 g/mol,
 (B) at least one epoxide compound having at least two epoxide groups per molecule and a specific epoxide group content of 500 to 10,000 mmol/kg (an "epoxide equivalent weight" of 100 to 2000 g/mol), to provide an epoxide-polyol adduct (AB), and then reaction of this adduct with
 (C) polyamines having at least three amine hydrogen atoms and at least one primary amino group per molecule, with subsequent chemical modification, if appropriate,
where the ratio of the number of hydroxyl groups of component (A) to the number of epoxide groups of component (B) is within the range of from 1:3 to 1:10, preferably from 1:3.5 to 1:9, particularly preferably within the range of from 1:4 to 1:8, and the ratio of the number of remaining epoxide groups in the epoxidepolyol adduct to the number of amine hydrogen atoms in polyamines (C) is within the range of from 1:1.5 to 1:100, preferably from 1:2 to 1:20.

According to the first embodiment of this invention, epoxide polyol adducts (AB) can be made by separately reacting a polyol (A1) having a weight-average molar mass $M_w$ of less than 4000 g/mol with at least one epoxide component (B), and a polyol (A2) having a weight-average molar mass $M_w$ of at least 4000 g/mol with the epoxide component (B), and subsequently mixing these epoxide polyol adducts (A1B) and (A2B) to form (AB).

In another embodiment, a mixture of polyols (A1) having each a weight-average molar mass $M_w$ of less than 4000 g/mol, and polyols (A2) having each a weight-average molar mass of at least 4000 g/mol can be reacted with the epoxide component (B) to form the epoxide polyol adduct (AB).

It is also possible within the scope of this invention to react two or more polyols each of groups (A1) and (A2), according to the first embodiment, as long as the polyols individually obey the molar mass selection condition.

In the mixture of epoxide polyol adducts (AB) according to the first embodiment, the poylol epoxide adduct (A1B) is present in the mixture with a mass fraction of up to 99%, preferably 20 to 95%, and particularly preferably 25 to 90% of the mass of said mixture, and the polyol epoxide adduct (A2B) is present in said mixture with a mass fraction of at least 1%, preferably between 5 and 80%, and particularly preferably between 10 and 75% of the mass of said mixture. Likewise, in the second embodiment, the mass fraction of polyol component (A1) is up to 99%, preferably 15 to 90%, and particularly preferably 20 to 85% of the sum of masses of all polyols employed, and the polyol component (A2) is present with a mass fraction of at least 1%, preferably between 10 and 85%, and particularly preferably between 15 and 80%, based on the sum of the masses of all polyols employed.

DETAILED DESCRIPTION OF PREFERRED EMBODIMENTS

Any aliphatic polyols (A) can be used as long as they preferably have, averaged over all polyols used, or as a mixture, respectively, a weight-average molar mass $M_w$ (gel permeation chromatography, polystyrene standard) of between 200 and 20,000, in particular, from between 1,000 to 10,000 g/mol, and an OH number within the range of from 5 to 600, preferably from 10 to 100 mg/g. The OH number (measured in mg/g) is the ratio of that mass of potassium hydroxide $m_{KOH}$ in mg which has just as many hydroxyl groups as a mass $m_B$ of the substance to be characterized to the mass $m_B$ of this substance in grams. Polyether polyols (polyoxyalkylene glycols) preferably having only terminal OH groups are particularly preferred. Useful aliphatic polyols in this regard include block copolymers of (i) ethylene oxide and propylene oxide with hydroxyl end groups and (ii) polyoxyethylene, polyoxypropylene and polyoxybutylene glycols, it also being possible to employ mixtures of the particular polyoxyalkylene glycols. Polyoxyethylene glycols are preferably used as at least one of the components, (A2), and include, in particular, a polyoxyethylene glycol having a weight-average molar mass $M_w$ of at least 4000 g/mol. Mixtures of two polyols are preferred, and particularly preferred are mixtures of two polyoxyethylene glycols, one of the two polyols (A1) having a weight-average molar mass within the range of from 500 to 3500, preferably from 700 to 2500 g/mol, and the other (A2) having a weight-average molar mass within the range of from 4000 to 20,000, preferably from 5000 to 10,000 g/mol. Polyester polyols, polyamide polyols and polyester-amide polyols, however, also can be employed as component (A1) if they fall within the range mentioned for the molar mass.

Possible educts (or starting materials) for these polyols include aliphatic and aromatic dicarboxylic acids, together with aliphatic dihydric alcohols and aliphatic or araliphatic diamines; purely aliphatic systems are preferably employed. The aliphatic dicarboxylic acids preferably have from 2 to 40 carbon atoms, and are preferably saturated, although a small portion (up to 5% of the amount of substance) can also be replaced by mono- or polyunsaturated dicarboxylic acids. Succinic acid, adipic acid, cyclohexanedicarboxylic acid and the so-called "dimeric fatty acids" are preferred. The aliphatic alcohols preferably have 2 to 20 carbon atoms and preferably two hydroxyl groups; however, a small proportion of up to 5 % of the amount of substance can be replaced by alcohols which are trihydric or more than trihydric. The preferred aliphatic alcohols are ethylene glycol, 1,2- and 1,3-propylene glycol and oligomeric polyoxyethylene and -propylene glycols and co-oligomers thereof having two to thirty oxyalkylene units in the molecule, butane-1,4-diol, neopentylglycol, hexanediol and cyclohexanedimethanol; alcohols of higher functionality include trimethylolpropane, trimethylolethane, pentaerythritol and sorbitol. Suitable aliphatic diamines are 1,4-diaminobutane, 1,6-diaminohexane, 2,2,4-trimethylhexanediamine, 1,2- and 1,4-diaminocyclohexane, isophoronediamine and the isomeric xylylenediamines, in particular also α,ω-polyoxyalkylenediamines which are obtainable, for example, under the trade name ®Jeffamine from Huntsman Chemicals.

Any epoxide compound (B) can be used in the invention so long as they react with the aliphatic polyols (A) to form an epoxide-polyol adduct. Suitable epoxide compounds (B) include, for example, those described in detail in U.S. Pat. No. 5,495,180 (corresponds to European application EP-A 0 618 245). The synthesis of the epoxide-polyol adducts from (A) and (B) and the catalysts used in this synthesis are also described in detail in these documents, the disclosures of which are incorporated by reference herein in their entirety.

The epoxide compounds corresponding to (B) preferably have a specific epoxide group content within the range of from 500 to 10,000 mmol/kg (epoxide equivalent weight of 100 to 2000 g/mol). They preferably include polyepoxides having on average at least two epoxide groups per molecule. These epoxide compounds can be both saturated and unsaturated as well as aliphatic, cycloaliphatic, aromatic and/or heterocyclic, and can also contain hydroxyl groups. They can furthermore contain those substituents and/or functional groups which cause no troublesome side reactions under the mixing or reaction conditions, such as, for example, alkyl or aryl substituents, ether groupings and the like.

These epoxide compounds preferably are polyglycidyl ethers based on polyhydric, preferably dihydric, alcohols having from 4 to 10 carbon atoms, polyoxyalkylene glycols having from 4 to 80 carbon atoms, polyhydric, preferably dihydric, phenols having from 6 to 20 carbon atoms, hydrogenation products of these phenols and/or on novolaks (reaction products of mono- or polyhydric phenols with aldehydes, in particular formaldehyde, in the presence of acid catalysts). The specific epoxide group contents of these epoxide compounds are particularly preferably between 1000 and 9000 mmol/kg, in particular between 2800 and 8000 mmol/kg (epoxide equivalent weights of from 110 to 1000, in particular between 125 and 350 g/mol).

Suitable polyhydric phenols include: resorcinol, hydroquinone, 2,2-bis(4-hydroxyphenyl)-propane (Bisphenol A), isomer mixtures of dihydroxydiphenylmethane (Bisphenol F), tetrabromobisphenol A, 4,4'-dihydroxydiphenylcyclohexane, 4,4'-dihydroxy-3,3'-dimethyldiphenylpropane, 4,4'-di-hydroxybiphenyl, 4,4'-dihydroxybenzophenone, 1,1-bis(4'-hydroxy-phenyl) ethane, 2,2-bis[4-(2'-hydroxypropoxy)phenyl]-propane, 1,1-bis(4-hydroxyphenyl)isobutane, 2,2-bis(4-hydroxy-3-tert-butylphenyl)propane, bis-(2-hydroxy-naphthyl)-methane, 1,5-dihydroxynaphthalene, tris(4-hydroxyphenyl)methane, bis(4-hydroxyphenyl) ether, bis(4-hydroxyphenyl) sulfone and the like, as well as the halogenation and hydrogenation products of the above-mentioned compounds. Bisphenol A is particularly preferred.

Suitable examples of polyhydric alcohols that can be used as a basis for the corresponding polyglycidyl ethers are ethylene glycol, diethylene glycol, triethylene glycol, polyethylene glycols (degree of polymerization n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentylglycol, trimethylolethane and trimethylolpropane. Poly-propylene glycols (n=8 to 10) are particularly preferred.

Polyglycidyl esters of polycarboxylic acids that can be obtained by the reaction of epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid can likewise be used. Suitable examples include diglycidyl adipate, diglycidyl phthalate and diglycidyl hexahydrophthalate.

A detailed list of suitable epoxide compounds useful in the present invention can be found in the handbook by A. M. Paquin, EPOXIDVERBINDUNGEN UND EPOXIDHARZE (Epoxide compounds and epoxy resins), Springer Verlag, Berlin 1958, Chapter IV, and in Lee, Neville, *Handbook of Epoxy Resins*, McGraw-Hill Book Co., 1967, Chapter 2, the disclosures of which are incorporated by reference herein in their entirety. The epoxide compounds mentioned can be employed individually or as a mixture.

The epoxide-polyol adduct can be prepared by any method known to react polyols (A) with epoxides (B). The epoxide-polyol adduct preferably is prepared by condensation of the polyether polyols (A) with the epoxide compounds (B) in the presence of suitable catalysts at a temperature within the range of from 50 to 200° C., preferably at a temperature of from 90 to 170° C. The ratio of the number of OH groups of components (A1) and (A2), or component (A), to the number of epoxide groups of component (B) preferably is within the range of from 1:3 to 1:10, more preferably from 1:3.5 to 1:9, and particularly preferably from 1:4 to 1:8, and the specific epoxide group content of the condensation product preferably are within the range of from 125 to 6700 mmol/kg, preferably from 1000 to 4000 mmol/kg (the epoxide equivalent weight being 150 g/mol to at least 8000 g/mol, preferably 250 g/mol to 1000 g/mol).

Suitable catalysts for the preparation of the epoxide-polyol adduct of components (A) and (B) include strong inorganic and organic bases, such as, for example, sodium hydroxide, potassium hydroxide, lithium hydroxide, barium hydroxide, strontium hydroxide, alkali metal alcoholates, such as sodium methylate, lithium methylate, sodium ethylate and potassium dodecylate, and the alkali metal salts of carboxylic acids, such as, for example, sodium stearate and lithium stearate. Strong inorganic and organic proton acids, for example phosphoric acid, tetrafluoroboric acid and benzenesulfonic acid, also are suitable. Lewis acids can furthermore be used as catalysts. Examples of suitable catalysts include tin(IV) chloride, titanium(IV) chloride, titanium(IV) isopropylate, triethyloxonium tetrafluoroborate and boron trifluoride and its complexes, for example with phosphoric acid, acetic acid (1:1 and 1:2), methanol, diethyl ether, tetrahydrofuran, phenol, ethylene glycol monoethyl ether, polyethylene glycol (molar mass 200 g/mol), dimethyl sulfoxide, di-n-butyl ether, di-n-hexyl ether, succinic acid and aliphatic, cycloaliphatic and araliphatic amines, as well as nitrogen-containing heterocyclic compounds. $BF_3$-diethyl ether, $BF_3$-amine complexes and aqueous tetrafluoroboric acid are preferably employed as catalysts. The mass fraction of catalyst is in general within the range of from 0.1 to 5, preferably from 0.1 to 1%, based on the mass of the reaction mixture. For better metering, the catalyst can be diluted with a solvent, such as diethyl ether, a glycol ether or cyclic ether, ketones and the like.

To prepare the adduct, the mixtures of compounds containing hydroxyl groups and epoxy groups to be reacted typically are heated to the temperature at which the condensation proceeds at a sufficient rate, i.e. within 30 minutes to 5 hours. The reaction usually is expediently followed via the decrease in the specific epoxide group content. The reaction can be interrupted by cooling to below the reaction temperature.

For the present invention, to achieve a pot life indication by an increase in viscosity, it is essential to employ mixtures of adducts, or adducts of mixtures, of at least two polyols wherein one of the polyols, viz. (A2), has a higher molar mass than 4000 g/mol. The average of the molar mass of the mixture of the epoxide-polyol adduct can be established in a controlled manner by using suitable mixtures of the polyols for reaction with the epoxide compound or separately prepared addition products thereof. The specific epoxide group content (SEC) used for characterization of the epoxide compounds indicates the amount of substance of epoxide groups (in mol, or mmol) per mass (in kg) of the compound in question. Its reciprocal is the formerly used so-called "EV value", or the "epoxide equivalent weight", calculated as the quotient of the molar mass of the compound and the number of epoxide groups present in the molecule.

Any polyamine (C) can be used in the invention as long as it can react with the aforementioned epoxide-polyol adduct. Suitable polyamines (C) include aliphatic or araliphatic amines having at least three amine hydrogen atoms per molecule and 2 to 15 carbon atoms or polyiminoalkylenediamines such as, for example those selected from: ethylenediamine, diethylenetriamine, triethylenetetramine, tetraethylenepentamine, pentaethylenehexamine, propylenediamine, dipropylenetriamine and the like, and furthermore 2,2,4- and/or 2,4,4-trimethylhexamethylenediamine, and reaction products thereof with ethylenically unsaturated monomers, in particular acrylonitrile, in a ratio of 1 mol to 1 mol, bis(3-aminopropyl)amine, 1,4-bis(3'-aminopropyl) piperazine, N,N-bis(3-aminopropyl)ethylenediamine, neopentanediamine, 2-methyl-1,5-pentanediamine, and the reaction product thereof with acrylonitrile in a ratio of 1 mol to 1 mol, 1,3-diaminopentane, hexamethylenediamine and the like, and cycloaliphatic amines, such as 1,2- and 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine and the reaction product thereof with acrylonitrile in a ratio of 1 mol to 1 mol, 4,4'-diaminodicyclohexylmethane and -propane, 2,2-bis(4-aminocyclohexyl)-methane and -propane, 3,3'-dimethyl-4,4'-diaminodicyclohexylmethane, 3-amino-1-cyclohexylaminopropane, 1,3- and 1,4-bis(aminomethyl) cyclohexane and meta- or paraxylylenediamine (1,3- or 1,4-bis(aminomethyl)benzene), and the reaction product thereof with acrylonitrile in a ratio of 1 mol to 1 mol up to 1 mol to 2 mol. The amines can be employed individually or as a mixture. The specific amine hydrogen content (SAHC), which is defined as the amount of substance of amine hydrogen atoms (in mol, or mmol) divided by the mass of the compound (in kg), can be used for characterization of the amines. Its reciprocal is the formerly used so-called "amine hydrogen equivalent", which is the quotient of the molar mass of the compound in question and the number of its amine hydrogen atoms.

The reaction of the epoxide-amine adduct of (A) and (B) with amines (C) can be carried out by any known method, and preferably is carried out by adding the adduct, or mixture of adducts, from the first reaction step, (AB), to component (C) at a temperature in the range of from 20 to 150° C., preferably in the range of from 40 to 90° C., and leaving the mixture in this temperature range until complete reaction of the epoxide groups with the amino groups has taken place.

Monounsaturated compounds (ethylenically unsaturated monomers) that react with the remaining primary and/or secondary amino groups then can be added. Compounds that are preferred in this regard include amides and esters of acrylic and methacrylic acid with alcohols having 1 to 8 carbon atoms, such as, for example, ethyl, hexyl and 2-ethylhexyl acrylate, and methyl, propyl and iso-butyl methacrylate, or the amides of these acids, as well as acrylonitrile and methacrylonitrile, individually or as a mixture. Tert.-butyl acrylate and acrylonitrile are preferred. The reaction of these compounds with any remaining primary and/or secondary amino groups preferably takes place by addition of the unsaturated compound to the addition product of (A), (B) and (C) at a temperature within the range of from 20 to 100° C., the ratio chosen for the amount of substance of the amine hydrogen atoms to the amount of substance of the unsaturated compound being within the range of from 2.0 mol to 1.0 mol up to 100 mol to 1.0 mol. The modification with the unsaturated compound can also optionally be carried out on the polyamines (C) before reaction with the adduct, or mixture of adducts, (AB).

Thereafter, the hardener according to the invention is ready to use. It can be employed either in the existing form or as an emulsion in water. Suitable reaction partners for these hardeners include liquid epoxy resins, water-emulsifiable epoxy resins or solid epoxy resin dispersions, the amount of hardener being chosen such that the ratio of the amount of substance of amine hydrogen atoms (in mol) in the hardener according to the invention to the amount of substance of epoxide groups (in mol) of the resin chosen as the reaction partner is within the range of from 1:0.75 to 1:2.0. The hardeners according to the invention can be used in combination with suitable epoxy resins as protective paint for mineral substrates, i.e., on plaster, concrete, masonry and cement. Walls, ceilings and floors in garages, canteens, hospitals, dairies, public baths, tunnels and nuclear power stations, for example, also can be coated. In an appropriate formulation, the systems according to the invention can also be used as corrosion protection primers on steel substrates. Use as high-gloss clear paints for the most diverse substrates, such as, for example, wood, also is possible.

On the basis of their outstanding technological properties, for example with respect to adhesion, very high hardness, corrosion protection action, resistance to water and chemicals and the like, the hardeners obtained according to the invention are suitable in combination with solid resin dispersions for the production of coverings, intermediate coatings, paint materials, molding compositions and curable compositions for the most diverse fields of use. For example, they can be used for the production of protective and/or decorative coatings on the most diverse, in particular rough and porous, substrates, such as, for example, wood, mineral substrates (for example concrete and stone), glass, plastics (for example polyethylene, polypropylene and the like), composite materials, ceramic and pretreated or non-pretreated metals.

The following examples are intended to represent the invention without having a limiting effect by their choice:

EXAMPLES

I. Polyol-epoxide Adducts Based on Polyethylene Glycol

General Working Instructions

®Beckopox EP 140 (bisphenol A diglycidyl ether having a specific epoxide group content of 5525 mmol/kg (EV value 181 g/mol, Vianova Resins GmbH), (181 g)) as component (B) was heated to 125° C. in a nitrogen atmosphere with the corresponding amount of polyoxyethylene glycol (cf. Table 1) as component (A). A $BF_3$-amine complex (1.5 g) were added as the catalyst (®Anchor 1040 from Air Products), while stirring thoroughly, and the temperature was increased continuously to 150° C. During this procedure, the specific epoxide group content dropped to somewhat below the theoretical value.

TABLE 1 polyol-epoxide adducts based on bisphenol A diglycidyl ether

| Example | $M_w$ PEG g/mol | n(EP)/ n(OH) | EV th. g/mol | SEC th. mmol/kg | EV Disc. g/mol | SEC Disc. mmol/kg | Temp. Disc ° C. | Duration h |
|---|---|---|---|---|---|---|---|---|
| Add-1 | 4000 | 4.4 | 831 | 1203 | 990 | 1010 | 155 | 4 |
| Add-2 | 6000 | 3.0 | 1775 | 563 | 2093 | 478 | 150 | 2.5 |
| Add-3 | 8000 | 3.0 | 1425 | 702 | 1714 | 583 | 160 | 3 |
| Add-4 | 8000 | 4.4 | 1112 | 899 | 1324 | 755 | 155 | 2 |
| Add-C | 1000 | 4.3 | 385 | 2597 | 420 | 2381 | 160 | 3 |

PEG: Polyoxyethylene glycol
n(EP) Amount of substance of epoxide groups (in mol)
n(OH) Amount of substance of hydroxyl groups (in mol)
n(EP)/n(OH) Ratio of the amounts of substance (or number) of epoxide groups and hydroxyl groups
EV: "Epoxide equivalent weight"
$M_w$: Weight-average molar mass
Add-C: Comparison example
th. Theoretical
Disc. On discontinuation Equation for the theoretical SEC:

$$SEC = \frac{2*[n(EP)/n(OH)] - 1}{M_w(PEG) + 2*[n(EP)/n(OH)]*181}$$

II. Epoxide Hardeners

The following examples illustrate how water-dilutable curing agents with a pot life indication can be obtained by addition of epoxide-functional polyol-epoxide adducts based on high molar mass polyethylene glycols to a polyol-epoxide adduct based on low molar mass polyethylene glycols and subsequent reaction with monomeric polyamines.

II.1 Composition of the Hardeners 1,3-bis(aminomethyl)benzene and isophoronediamine (for the amounts see Table 2) were initially introduced into a reaction vessel at 40° C. The polyolepoxide adduct mixture (for the amount and composition see Table 2) was added such that a temperature of 80° C. was not exceeded during the exothermic reaction which had by now occurred. The mixture was then kept at 80° C. until the epoxide groups had reacted completely (about 4 hours). To monitor the conversion, the amine number (mass of KOH in mg which bonds as much acid for neutralization as a sample of the substance in question, divided by the mass of the sample in g) and an apparent amine number (titration with and without addition of tetrabutylammonium bromide) were measured in accordance with DIN 16 945. The samples were dissolved in a mixture of equal parts by volume of glacial acetic acid/acetone and the solution was titrated with 0.1 N perchloric acid, dissolved in glacial acetic acid. It was determined that the reaction had ended when AN(with)=AN(without)

in which

AN(with) means: titration with an excess of tetrabutylammonium bromide

AN(without) means: titration without tetrabutylammonium bromide.

The samples were then diluted to 80% with deionized water.

TABLE 2

Epoxy resin hardeners

| Number | Polyol-epoxide adduct 1 Type | Parts | Polyol-epoxide adduct 2 Type | Parts | mXDA Parts | IPDA Parts | AN mg/g | n Pa·s |
|---|---|---|---|---|---|---|---|---|
| H-1 | Add-C | 557 | Add-1 | 983 | 173 | 216 | 244 | 16.0 |
| H-2 | Add-C | 590 | Add-2 | 66 | 173 | 216 | 238 | 20.1 |
| H-3 | Add-C | 557 | Add-3 | 983 | 173 | 216 | 239 | 17.5 |
| H-4 | Add-C | 557 | Add-4 | 983 | 173 | 216 | 250 | 15.9 |
| H-C | Add-C | 655 | — | — | 173 | 216 | 230 | 19.4 | mXDA 1,3-bis-(aminomethyl)-benzene
IPDA Isophoronediamine
AN Amine number in mg/g of the 80% strength solution in water
η Viscosity of the 80% strength solution in water stated in Pa·s according to ISO 3219, 23° C., shear rate 25 s$^{-1}$.
H-C: Comparison example, hardener ® Beckopox EH 613 (Vianova Resins GmbH, epoxide-amine adduct based on a mixture of isophoronediamine and m-xylylenediamine)

II.2 Use Testing

Hardeners H-1 to H-4 according to the invention and Comparison Example H-C were formulated as a clear paint on the one hand with an internally flexibilized solid epoxy resin dispersion, ®Beckopox EP 385w, and on the other hand with a self-emulsifiable liquid epoxy resin, ®Beckopox EP 147w. Stoichiometric crosslinking (amount of substance of epoxide groups and amine hydrogen atoms are the same) is chosen in both cases. In the combination with ®Beckopox EP 147w, the total mixture was adjusted to spray viscosity (flow time in the DIN-4 cup: 20 to 40 s) with water.

Like the comparison, the hardeners according to the invention had a short drying time (dust-dry), good resistance to water and high initial hardness. Good flow properties and a flawless nature of the film in all cases rounded off the good profile of the properties. However, only the hardeners based on polyol-epoxide adducts with high molar mass polyethylene glycols made in accordance with the present invention indicated a clear increase in viscosity (at least a tripling of the viscosity up to complete gelling) up to the end of the duration of use.

A similar increase in viscosity was obtained when mixtures of polyols comprising polyethylene glycol of $M_w$=1000 g/mol and polyethylene glycols of from 4000 to 8000 g/mol were reacted with the epoxide component, and this adduct was susbsequently reacted with a mixture of isophorone diamine and m-xylylene diamine.

Explanation of the Test Conditions:

1. Dust-dry: glass beads sprinkled on the film can no longer be removed with a brush after complete curing.
2. Non-tacky: the glass beads can be removed with a brush after complete curing.
3. König pendulum hardness: DIN 53 157.
4. Film clouding: After mixing of the hardener and dispersion, films of wet film thickness 200 μm are drawn every half hour. The occurrence of clouding in the film after complete curing indicates the end of the processing time and is entered as the test result.
5. Resistance to water after 24 hours, storage at room temperature: films drawn on sheets of glass with a wet film thickness of 200 μm are tested after storage for 24 hours in water at room temperature.

Clearcoats based on ®Beckopox EP 147w and the hardeners according to Example H-1 to H-4 and comparison H-C were adjusted to spray viscosity (flow time in the DIN-4 cup: 20 to 40 s), and both the gloss and the viscosity were measured as a function of time. In the case of hardeners H-1 to H-4 according to the invention, a tripling to quadrupling of the viscosity occurred up until the first noticeable drop in the gloss of the films, and after 24 hours the paint had gelled completely, while in the case of hardener H-C, no significant increase in the viscosity took place, and on the contrary, the viscosity dropped to half the original value. The liquid resins according to the invention thus also showed a pot life indication comparable to the conventional systems under conditions close to those in practice.

II.2.1 With Beckopox EP 385w

Beckopox EP 385w is an internally flexibilized solid epoxy resin dispersion, 56% strength in water, specific epoxide group content about 1961 mmol/kg (epoxide equivalent weight about 510 g/mol, Vianova Resins GmbH).

| Hardener | | Hardeners according to the invention H-1 | H-2 | H-3 | H-4 | Comparison H-C |
|---|---|---|---|---|---|---|
| Mass of resin, 56% strength | g | 100 | 100 | 100 | 100 | 100 |
| Mass of hardener, 40% strength | g | 31.2 | 31.7 | 30.4 | 30.6 | 31.9 |
| Viscosity after mixing | # | 420 | 364 | 350 | 302 | 712 |
| Processing time according to gloss | h:min | 1:30 | 1:30 | 2:30 | 2:30 | 1:30 |
| Viscosity at the end of the processing time | # | 2160 | 3584 | 3690 | 2095 | 971 |
| Drying dust-dry | h:min | 1:00 | 1:15 | 1:20 | 1:15 | 0:50 |
| Drying non-tacky | h:min | 5:15 | 6:30 | 7:30 | 7:30 | 5:00 |
| Flow | * | 1 | 1 | 1 | 1 | 1 |
| Film transparency | * | 0–1 | 0–1 | 0–1 | 0–1 | 1 |
| Surface adhesive | * | 0 | 0 | 0 | 0 | 0 |
| Pendulum hardness after 1 day | s | 60 | 67 | 45 | 50 | 60 |
| Pendulum hardness after 2 days | s | 88 | 97 | 64 | 70 | 93 |
| Pendulum hardness after 7 days | s | 122 | 136 | 105 | 107 | 122 |
| Resistance to water after 24 hours | * | 2 | 2–3 | 2–3 | 2–3 | 2 |
| Resistance to hot water after 7 days | * | 3–4 | 3 | 3 | 3 | 3–4 |
| Pendulum hardness | s | 81 | 87 | 97 | 66 | 107 |

-continued

| | Hardeners according to the invention | | | | Comparison |
|---|---|---|---|---|---|
| Hardener | H-1 | H-2 | H-3 | H-4 | H-C |
| after the water resistance test Pendulum hardness in a steam chamber (s) | 80 | 97 | 69 | 67 | 80 |

*Scale: 0 = excellent to 5 = poor,
Test conditions: 22° C. and 45% relative atmospheric humidity
Viscosity in mPa · s, measured according to ISO 3219, 25° C. shear rate 25 $s^{-1}$ II.2.2 With Beckopox EP 147w Beckopox EP 147w is a self-emulsifying liquid epoxy resin, 100% strength, specific epoxide group content about 5260 mmol/kg (epoxide equivalent weight about 190 g/mol, Vianova Resins GmbH).

| | | Hardeners according to the invention | | | | Comparison |
|---|---|---|---|---|---|---|
| Hardener | | H-1 | H-2 | H-3 | H-4 | H-C |
| Mass of resin, 70% strength | g | 50 | 50 | 50 | 50 | 50 |
| Mass of hardener, 40% strength | g | 52.5 | 53.4 | 51.2 | 51.5 | 53.7 |
| Deionized water | g | 37 | 25 | 31 | 32 | 25 |
| Viscosity after mixing | # | 37 | 39 | 35 | 37 | 25 |
| Processing time according to gloss | h:min | 1:00 | 0:50 | 1:30 | 1:20 | 1:30 |
| Viscosity at the end of the processing time | # | 210 | 150 | 130 | 170 | 12 |
| Drying dust-dry | h:min | 4:00 | 3:15 | 3:30 | 3:30 | 2:50 |
| Drying non-tacky | h:min | >8:00 <24:00 | >8:00 <24:00 | >8:00 <24:00 | >8:00 <24:00 | >8:00 <24:00 |
| Flow | * | 2–3 | 2–3 | 2–3 | 2–3 | 2–3 |
| Film transparency | * | 0 | 0 | 0–1 | 0–1 | 0 |
| Surface adhesive | * | 0 | 0 | 0 | 0 | 0 |
| Pendulum hardness after 1 day | s | 93 | 101 | 91 | 121 | 115 |
| Pendulum hardness after 2 days | s | 131 | 146 | 138 | 170 | 159 |
| Pendulum hardness after 7 days | s | 189 | 177 | 191 | 197 | 194 |
| Resistance to water after 24 hours | * | 1 | 1 | 2 | 0 | 0–1 |
| Resistance to hot water after 7 days | * | 1 | 0–1 | 2–3 | 0–1 | 0 |
| Pendulum hardness after the water resistance test | s | 101 | 134 | 94 | 117 | 91 |
| Pendulum hardness in a steam chamber | s | 138 | 152 | 134 | 197 | 152 |

*Scale: 0 = excellent to 5 = poor,
Test conditions: 21° C. and 43% relative atmospheric humidity
Viscosity: flow time in the DIN-4 cup according to the measurement method DIN 53 211

While the invention has been described in detail with reference to particularly preferred embodiments, those skilled in the art will appreciate that various modifications can be made to this invention without departing from the spirit and scope thereof. All documents referred to herein are incorporated by reference in their entirety.

What is claimed is:

1. A water-dispersible curing agent for epoxy resins which, when mixed with epoxy resins, shows the end of the curing time by at least a tripling of viscosity, whereby the curing agent is prepared by a process comprising:
reacting
(A) two or more aliphatic polyols having a weight-average molar mass $M_w$ of the mixture of 200 to 20,000 g/mol,
(B) at least one epoxide compound having at least two epoxide groups per molecule and a specific epoxide group content of 500 to 10,000 mmol/kg and an epoxide equivalent weight of 100 to 2000 g/mol, to provide an epoxide-polyol adduct (AB), and
then reacting this adduct with
(C) polyamines having at least three amine hydrogen atoms and at least one primary amino group per molecule, optionally with subsequent chemical modification comprising addition of monoethylenically unsaturated monomers to remaining primary or secondary amino groups of compounds (C),
where the ratio of the number of hydroxyl groups of component (A) to the number of epoxide groups of component (B) is within the range of from 1:3 to 1:10, preferably from 1:3.5 to 1:9, particularly preferably within the range of from 1:4 to 1:8, and the ratio of the number of remaining epoxide groups in the epoxide-polyol adduct to the number of amine hydrogen atoms in polyamines (C) is within the range of from 1:1.5 to 1:100, preferably from 1:2 to 1:20,
wherein the adduct (AB) is either made by separately reacting a polyol (A1) having a weight-average molar mass $M_w$ of less than 4000 g/mol with at least one epoxide component (B), and a polyol (A2) having a weight-average molar mass $M_w$ of at least 4000 g/mol with the epoxide component (B), and subsequently mixing these epoxide polyol adducts (A1B) in a mass fraction of up to 99%, and (A2B) in a mass fraction of at least 1%, each based on the mass of the mixture (AB), to form (AB), or wherein a mixture of polyol (A1) having a weight-average molar mass $M_w$ of less than 4000 g/mol, and a polyol (A2) having a weight-average molar mass of at least 4000 g/mol, with (A1) being present in said mixture in a mass fraction of up to 99% and (A2) being present in said mixture in a mass fraction of at least 1%, is reacted with the epoxide component (B) to form the epoxide polyol adduct (AB), and wherein the ratio of the number of hydroxyl groups of component (A) to the number of epoxide groups of component (B) is within the range of from 1:3 to 1:10, and the ratio of the number of remaining epoxide groups in the epoxide-polyol adduct to the number of amine hydrogen atoms in polyamines (C) is within the range of from 1:1.5 to 1:100.

2. The water-dispersible curing agent for epoxy resins as claimed in claim 1, wherein the polyol component (A) is a mixture of a polyoxyethylene glycol (A2) having a weight-average molar mass of at least 4000 g/mol and a polyol (A1) selected from the group consisting of polyether polyols, polyester polyols, polyamide polyols and polyester-amide polyols.

3. The water-dispersible curing agent for epoxy resins as claimed in claim 2, wherein the weight-average molar mass of polyol (A1) is 500 to 3500 g/mol.

4. The water-dispersible curing agent for epoxy resins as claimed in claim 1, wherein the hydroxyl number of the aliphatic polyol mixture component (A) is 5 to 600 mg/g.

5. The water-dispersible curing agent for epoxy resins as claimed in claim 1, wherein epoxide component (B) is selected from one or more of the group consisting of diglycidyl ethers of dihydric alcohols having 4 to 10 carbon atoms, polyoxyalkylene glycols having 4 to 80 carbon atoms, dihydric phenols having 6 to 20 carbon atoms and novolaks.

6. The water-dispersible curing agent for epoxy resins as claimed in claim 1, wherein component (C) is one or more polyamines selected from aliphatic diprimary diamines having 2 to 15 carbon atoms and polyiminoalkylene-diamines.

7. The water-dispersible curing agent for epoxy resins as claimed in claim 1, wherein, before or after the reaction with the epoxide-polyol adduct (AB), the polyamines of component (C) are reacted with ethylenically unsaturated monomers selected from the group consisting of: esters of acrylic and methacrylic acid and alcohols having 1 to 8 carbon atoms; amides of acrylic and methacrylic acid and alcohols having 1 to 8 carbon atoms; methacrylonitrile; and acrylonitrile.

8. The water-dispersible curing agent for epoxy resins as claimed in claim 1, wherein in the first step, epoxide polyol adducts are formed separately from polyol (A1) and epoxide component (B), and from polyol (A2) and epoxide component (B), these adducts (A1B) and (A2B) are then mixed, and reacted with the amine component (C) in the second step.

9. The water-dispersible curing agent for epoxy resins as claimed in claim 8, wherein the ratio of the number of hydroxyl groups of components (A1) and (A2) to the number of epoxide groups of component (B) is within the range of from 1:3 to 1:4.4.

10. The water-dispersible curing agent for epoxy resins as claimed in claim 1, wherein the reaction of component (A) and (B) takes place in the presence of at least one catalyst selected from the group consisting of $BF_3$-diethyl ether, $BF_3$-amine complexes and aqueous tetrafluoroboric acid.

11. The water-dispersible curing agent for epoxy resins as claimed in claim 1, wherein component (C) is a mixture of isophoronediamine and 1,3-bis(amino-methyl)benzene.

12. A method of preparing a water-dispersible curing agent for epoxy resins which, when mixed with epoxy resins, shows the end of the curing time by at least a tripling of viscosity, comprising:

reacting
(A) two or more aliphatic polyols having a weight-average molar mass $M_w$ of the mixture of 200 to 20,000 g/mol,
(B) at least one epoxide compound having at least two epoxide groups per molecule and a specific epoxide group content of 500 to 10,000 mmol/kg and an epoxide equivalent weight of 100 to 2000 g/mol, to provide an epoxide-polyol adduct (AB), and then reacting this adduct with
(C) polyamines having at least three amine hydrogen atoms and at least one primary amino group per molecule, optionally with subsequent chemical modification, comprising addition of monoethylenically unsaturated monomers to remaining primary or secondary amino groups of compounds (C), where the ratio of the number of hydroxyl groups of component (A) to the number of epoxide groups of component (B) is within the range of from 1:3 to 1:10, preferably from 1:3.5 to 1:9, particularly preferably within the range of from 1:4 to 1:8, and the ratio of the number of remaining epoxide groups in the epoxide-polyol adduct to the number of amine hydrogen atoms in polyamines (C) is within the range of from 1:1.5 to 1:100, preferably from 1:2 to 1:20, wherein the adduct (AB) is either made by separately reacting a polyol (A1) having a weight-average molar mass $M_w$ of less than 4000 g/mol with at least one epoxide component (B), and a polyol (A2) having a weight-average molar mass $M_w$ of at least 4000 g/mol with the epoxide component (B), and subsequently mixing these epoxide polyol adducts (A1B) in a mass fraction of up to 99%, and (A2B) in a mass fraction of at least 1%, each based on the mass of the mixture (AB), to form (AB), or wherein a mixture of a polyol (A1) having a weight-average molar mass $M_w$ of less than 4000 g/mol, and a polyol (A2) having a weight-average molar mass of at least 4000 g/mol, with (A1) being present in said mixture in a mass fraction of up to 99%, and (A2) being present in said mixture in a mass fraction of at least 1%, is reacted with the epoxide component (B) to form the epoxide polyol adduct (AB), and wherein the ratio of the number of hydroxyl groups of component (A) to the number of epoxide groups of component (B) is within the range of from 1:3 to 1:10, and the ratio of the number of remaining epoxide groups in the epoxide-polyol adduct to the number of amine hydrogen atoms in polyamines (C) is within the range of from 1:1.5 to 1:100.

13. The method as claimed in claim 12, wherein polyamine (C) is reacted with ethylenically unsaturated monomers before the reaction with the polyolepoxide adduct.

14. The method as claimed in claim 12, wherein at least two polyols are used as component (A).

15. The method as claimed in claim 12, wherein each of the polyols of component (A) is reacted in itself with one or more epoxides of component (B) to produce the epoxidepolyol adducts, and then these epoxide-polyol adducts are mixed before the reaction with component (C).

16. The method as claimed in claim 12, wherein component (A2) is a polyoxyethylene glycol having a weight-average molar mass $M_w$ of at least 4000 g/mol, and component (B) is bisphenol A diglycidyl ether.

17. The method as claimed in claim 16, wherein the ratio of the number of hydroxyl groups of component (A) to the number of epoxide groups of component (B) is within the range of from 1:3 to 1:4.4.

18. The method as claimed in claim 12, wherein the reaction of component (A) and (B) takes place in the presence of at least one catalyst selected from the group consisting of $BF_3$-diethyl ether, $BF_3$-amine complexes and aqueous tetrafluoroboric acid.

19. The method as claimed in claim 12, wherein component (C) is a mixture of isophoronediamine and 1,3-bis (aminomethyl)benzene.

20. A two component coating composition comprising a water-dispersible curing agent for epoxy resins as claimed in claim 1, and an epoxy resin.

* * * * *